United States Patent [19]

Bennett et al.

[11] Patent Number: 4,897,782

[45] Date of Patent: Jan. 30, 1990

[54] LOCAL CACHE STRUCTURE FOR MAINTAINING UPDATED FILE CHARACTERISTICS IN A FILE SHARING SYSTEM

[75] Inventors: Robert B. Bennett, Endwell, N.Y.; Robert J. Catino, Grapevine, Tex.

[73] Assignee: International Business Machines Corporation, Armonk, N.Y.

[21] Appl. No.: 110,461

[22] Filed: Oct. 19, 1987

[51] Int. Cl.$^4$ .............................................. G06F 13/00
[52] U.S. Cl. .................. 364/200; 364/228.3; 364/243.4; 364/243.41; 364/282.1; 364/282.3; 364/283.1; 364/300
[58] Field of Search ................................. 364/200, 300

[56] References Cited

U.S. PATENT DOCUMENTS

| | | | |
|---|---|---|---|
| 3,916,387 | 10/1975 | Woodrum | 364/200 |
| 4,086,628 | 4/1978 | Woodrum | 364/200 |
| 4,399,504 | 8/1983 | Obermarck et al. | 364/200 |
| 4,408,273 | 10/1983 | Plow | 364/200 |
| 4,432,057 | 2/1984 | Daniell et al. | 364/300 |
| 4,480,304 | 10/1984 | Carr et al. | 364/200 |
| 4,498,145 | 2/1985 | Baker et al. | 364/900 |
| 4,506,326 | 3/1985 | Shaw et al. | 364/300 |
| 4,507,751 | 3/1985 | Gawlich et al. | 364/900 |
| 4,641,274 | 2/1987 | Swank | 364/900 |

Primary Examiner—Raulfe B. Zache
Attorney, Agent, or Firm—David S. Romney; John S. Sensny

[57] ABSTRACT

A file sharing system, comprising a file access processor and a plurality of application support processors; and the file access processor, in turn, includes a central data access system and a storage system is provided to form directories from data in the database, and to change data in that database. Each support processor includes a local cache to acquire and hold directories formed by the data access system; and for each directory acquired by at least one support processor, the data access system further includes a directory gate and a multitude of directory change blocks holding information describing changes in the database that affect the directory. The directory change blocks established for a given directory are arranged in a first chain anchored to the directory gate established for the directory. For each support processor that has acquired at least one directory, the data access system further includes a directory acquired block for each directory acquired by the support processor. Preferably, the directory acquired blocks established for a given directory are arranged in a second chain also anchored to the directory gate established for the given directory.

26 Claims, 12 Drawing Sheets

LOCAL CACHE STRUCTURE FOR MAINTAINING UPDATED FILE CHARACTERISTICS IN A FILE SHARING SYSTEM

BACKGROUND OF THE INVENTION

This invention generally relates to cache management in a file sharing system, and more particularly, to a cache management system especially well-suited to update directories acquired by application support processors of the file sharing system.

A file sharing system includes a central file access processor and a plurality of application support processors. The file access processor manages access to a database, may be used to form directories from data in that database, and allows the support processors to acquire those formed directories. A group of application support processors may operate asynchronously, sharing the set of file resources managed by a file access processor, and the application support processors also maintain local caches in which various acquired directories may be stored. These local caches improve the performance of the application support processors by reducing the need to communicate with the file access processor for information about files in the file access processor.

Generally, a file access processor includes a service system, a data access system, and a storage access system. The service system provides a variety of services for the processor, including the initial receipt of requests, forwarding responses for file access, and dispatching an activation of the data access system. The data access system processes individual requests and maintains a set of catalogues that contain control and descriptive information concerning the set of files managed by the file access processor. These catalogues include data file control, security, integrity, concurrency, inter-relationship, recovery, status, and other control information. The storage access system manages the data blocks that comprise the data files, the set of records that comprise the catalogues, the set of locks that permit concurrency, and the grouping of work items that represent recovery units.

A group of application support processors may each acquire the same directory from the file access processor, and a user at a first of these support processors may make several changes to the directory. It is desirable that these changes themselves be transmitted to the other support processors that have acquired the same directory in order to keep these directory copies current. Moreover, it is important that the recording, storing and transmission of directory change data be done in an efficient and effective manner.

SUMMARY OF THE INVENTION

An object of this invention is to provide cache management support for a file sharing system.

Another object of the present invention is to provide methods and systems for updating directories acquired by application support processors serviced by a central file access processor.

A further object of this invention is to store changes made to a directory by an application support processor serviced by a file access processor, and to transmit those changes automatically to other application support processors that have acquired that same directory.

These and other objectives are obtained with a file sharing system including a file access processor and a plurality of application support processors; and the file access processor, in turn, includes a central data access system and a storage access system. The file access processor is provided for processing requests; and the storage access system is provided for accessing a database. The central data access system includes means to form a plurality of directories from data in the database and means to change data in that database. The application support processors are connected to the central data access system to transmit data to and to receive data from the central data access system; and each application support processor includes means to receive input from a user and to transmit the input to the central data access system, and a cache to acquire and hold directories formed by the data access system.

For each directory acquired by at least one application support processor, the central data access system further includes a directory gate block, and a multitude of directory change request blocks. Each directory change request block holds information identifying and describing a change in the database that applies to the directory; and the directory change request blocks are grouped in a chain, with a first directory change request block in the chain being identified by the directory gate block, and each subsequent directory change request block in the chain being identified by a prior directory change request block in the chain.

For each application support processor that has acquired at least one directory, the central data access system further includes a local control structure established for the support processor, and a directory acquired block for each directory acquired by the application support processor. The directory acquired blocks are grouped in a local chain, with a first directory acquired block in this chain being identified by the local control structure established for the application support processor, and each subsequent directory access block in the local chain being identified by a prior directory acquired block in the chain. Preferably, all of the directory acquired blocks established for a given directory are grouped in a participating chain. A first of the directory acquired blocks in the participating chain is identified by the directory gate block established for the given directory, and each subsequent directory acquired block in this chain is identified by a prior directory acquired block in the participating chain.

Periodically, records of changes to the database that apply to acquired directories, are transmitted to the application support processors that have acquired those directories to update these directory copies. More specifically, the data acquired blocks established for each application support processor are periodically checked to identify all the directories acquired by the application support processor, and records of changes that apply to those directories are then transmitted to that processor.

Further benefits and advantages of the invention will become apparent from a consideration of the following detailed description given with reference to the accompanying drawings, which specify and show preferred embodiments of the invention.

DETAILED DESCRIPTION OF THE PREFERRED EMBODIMENTS

Figure 1:
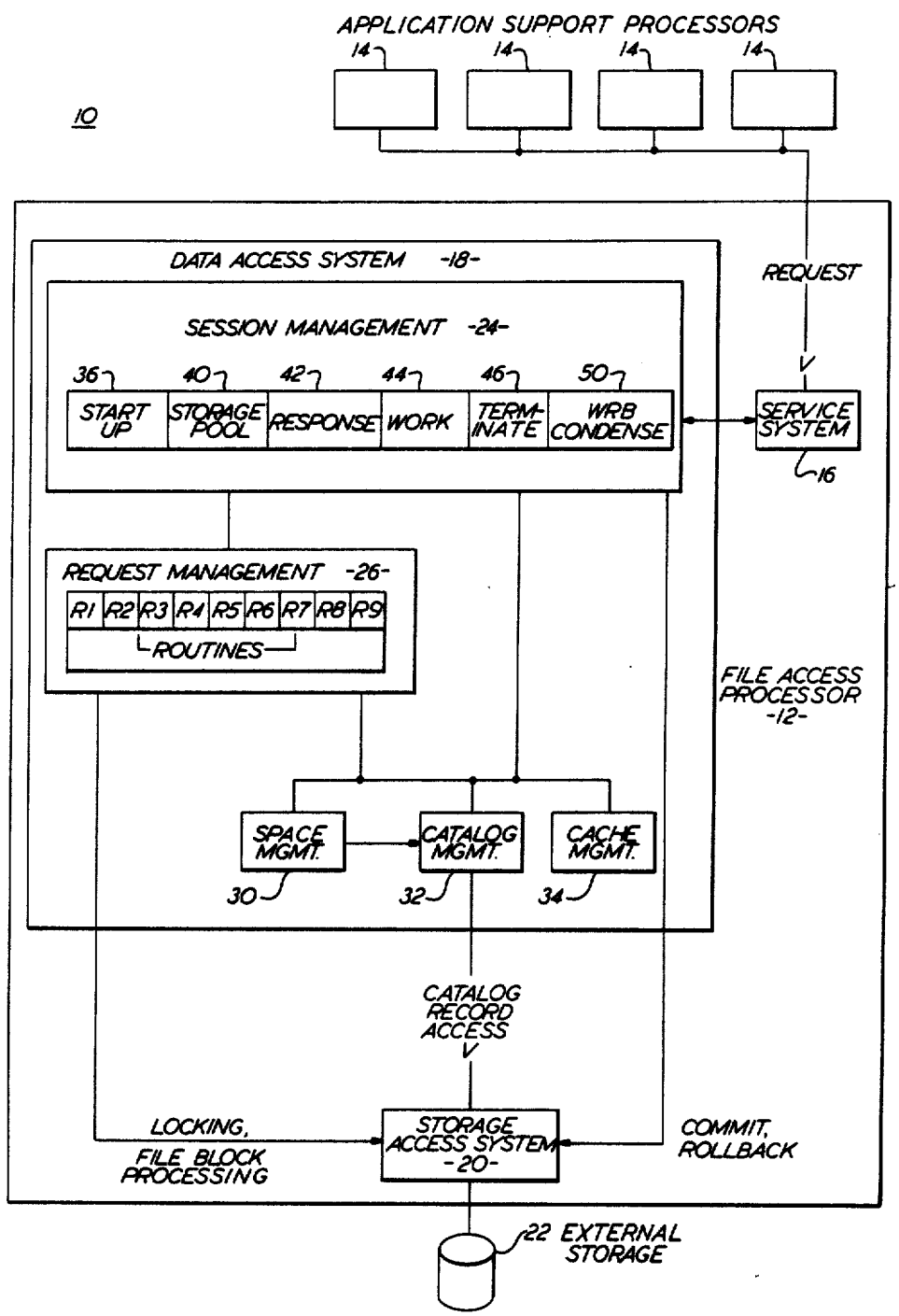
FIG. 1 is a block diagram generally outlining a file access processor, several systems thereof, and its relationship to a group of application support processors.

FIG. 1 illustrates file sharing system 10 comprising a central file access processor 12 and a multitude of application support processors 14. The file access processor includes service system 16, data access system 18 and storage access system 20. A File Access Processor 12 services requests from a set of Application Support Processors 14 which can exist in a global network, with each Application Support Processor sharing access to data in files stored by and managed by one or more File Access Processors 12. Each Application Support Processor 14 also maintains an internal cache of file information to improve performance by reducing communications with the File Access Processor 12 for information about files.

File Access Processor 12 manages access to a set of data files and information about files held in file directories. File directories allow for grouping and managing file collections, relate to each other hierarchically, and may be shared. The File Access Processor also maintains therein a set of catalogs, which are repositories of internal information in the File Access Processor for its own internal use, and which are not directly available and accessible to Application Support Processors, as are the data files and directories.

The Service System 16 provides environmentally dependent services for the processor 12, including the initial receipt of requests, forwarding requests for file access, and dispatching an activation of the Data Access System 18. The Data Access System 18 processes individual requests, and maintains a set of catalogs that contain control and descriptive information concerning the set of directories and files managed by the File Access Processor 12. The Storage Access System 20 manages the data blocks that comprise the data files, which may form a database stored in an external data storage medium 22. The Storage Access System also manages the set of records that comprise the catalogs, the set of locks that permit concurrency, and the grouping of work items that represent recovery units.

The Data Access System has a number of subcomponents including the Session Management Subcomponent 24, the Request Management Subcomponent 26, the Space Management Subcomponent 30, the Catalog Management Subcomponent 32, and the Cache Management Subcomponent 34. The Session Management Subcomponent receives requests through the Service System and it is the focal point of control and includes a set of fundamental services for response formulation. Session Management determines which Request Management Subcomponent routine should be invoked to service a request and passes control to Request Management; and at the end of request processing, Request Management passes control back to the Session Management Subcomponent to finish request processing and to forward the requested response.

Session Management Subcomponent includes a number of service routines. A start-up routine 36 is used to initialize Data Access System control structures, and a storage Pool routine 40 is used to maintain and dispense working storage for control structures. A response routine 42 is employed to assist Request Management Subcomponent routines build response messages, and to assemble the response and cache update information into a properly formatted response message. A work routine 44 is utilized to coordinate and initiate processing required when a logical group of requests are "committed" or "rolled back", i.e. manage activities at designated points of recovery.

The Work routine invokes the Catalog Management Subcomponent to accomplish catalog updates based upon Work Request Blocks (WRBs) built by Request Management, and the Work routine invokes the Space Management Subcomponent to coordinate the update of the Space Catalog. The Work routine also invokes the Storage Access System to commit changes to file blocks and catalogs, and invokes the Cache Management Subcomponent 34 to store cache notification information.

The Session Management Subcomponent further includes a Terminate routine 46 to clean up control structures at the conclusion of an activation of the Data Access System, and a WRB Condense routine 50, which supports reduction of multiple changes to the same catalog entry into a single change. The Data Access System utilizes several catalogs for managing file and directory information, and each entry in the Object Catalog, for example, contains descriptive and control information about a particular file. Work Request Blocks (WRBs) are used to save catalog change information from the time of file request processing until the time that the work unit is committed. When multiple WRBs exist for the same catalog entry, they are condensed into a single WRB.

The Request Management Subcomponent 26 includes routines for each type of request the Data Access System is designed to process As illustrated is FIG. 1, Request Management includes nine routines R1 through R9, although a typical Request Management subsystem has thirty to forty routines. Request Management utilizes the Catalog Management Subcomponent to access catalogs, uses the Space Management Subcomponent 30 to manage logical space, and employs the Cache Management Subcomponent for cache control processing. In addition, Request Management builds and maintains WRBs (Work Request Blocks), which go the the Work routine at commit time——that is, at the successful completion of a work unit——to drive catalog and cache updates. The Request Management Subcomponent 26 utilizes the Storage Access System 20 directly to engage or disengage one or more logical locks that represent commitments against files and catalogs; and Request Management invokes the Storage Access System to add, delete, and update data blocks associated with particular files according to the requirements of the current request.

The Catalog Management Subcomponent assembles the control structures required to invoke the Storage Access System 20 to access the set of catalogs that the Data Access System 18 utilizes for control information for its set of directories and files. The Space Management Subcomponent manages the logical space for an Application Support Processor represented by a FSCB (File Space Control Block), a local representation of the Space Catalog entry for the Application Support Processor. Requests that affect logical space consumption due to changes in the storage consumed by files accomplish space accounting though the Space Management Subcomponent. The Space Management Subcomponent also uses the Catalog Management Subcomponent 32 to access the Space Catalog. The Cache Management Subcomponent is invoked by the Work routine of the Session Management Subcomponent at the successful completion of a work unit to update the cached data maintained by the Data Access System 20, using information in WRBs built by the Request Management Subcomponent.

A Cache Management System which provides a local cache structure for maintaining updated file characteristics in a file sharing system is described in detail below. Other features of such a file sharing system are disclosed in the following related copending applications which are owned by the assignee of the subject application and were all filed on the same Oct. 19, 1987 filing data: Ser. No. 110,463 relates to space management; Ser. No. 110,362 relates to a locking protocol; and Ser. No. 110,370 relates to the data access system managing requests for shared access to data files. All three of the above-identified applications are incorporated herein by reference.

The purpose of the Cache Management is to collect a set, or cache, of directory change information, representing changes to file descriptions and characteristics, and periodically to distribute that change information to the Application Support Processors to update their local caches. This cache management improves the performance of the File Sharing System by reducing the need of the Application Support Processors to go to the File Access Processor for file information.

The Application Support Processors permit directories to be acquired in their local caches, and a local cache is kept for a particular directory whenever an Application Support Processor acquires that directory. When acquiring a directory, an Application Support Processor obtains all information about that directory and its files from the File Access Processor, and this information is used initially to load the Application Support Processor's local cache. Concurrently, the File Access Processor is notified that the Application Support Processor requires notification of all future changes that affect the acquired directory, and this change notification requirement remains in effect until the acquired directory is explicitly released from the local cache of the Application Support Processor.

Figure 2:
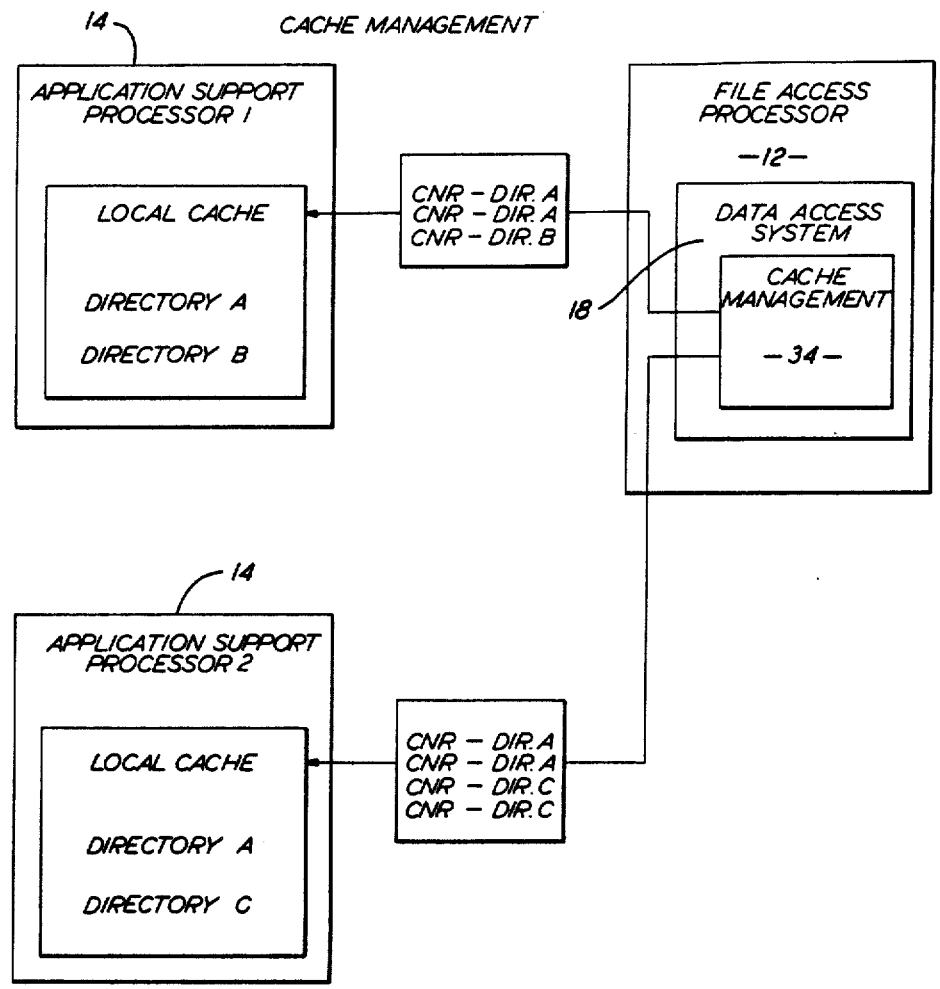
FIG. 2 is a block diagram showing the transmission of certain data from the file access processor to a pair of application support processors.

Preferably, information for updating the local cache of an Application Support Processor is transmitted to that Processor along with normal response information that is transmitted to the Application Support Processor in response to an activation of the File Access Processor by the Application Support Processor——that is, in response to a request or inquiry from the Support Processor. Information for updating the local caches includes such items as changes to file names, file lengths, file status, and authorization to access a file. The cache change information is transmitted to the Application Support Processors in the form of individual records called Cache Notification Records (CNRs). This is illustrated in FIG. 2.

In order to manage cache notification information for Application Support Processors, the Data Access System performs several functions. First, Data Access System records which directories have been acquired by particular Application Support Processors, and this is done by means of an ACQUIRE operation, discussed in detail below. Second, as part of a NOTIFY operation, also discussed in detail below, the Data Access System recognizes changes in directory and file data that affect the central cache, records these directory changes, and accumulates the change information until the appropriate time for sending it to the interested Application Support Processors to update their local caches. Third, in a RETRIEVE operation, the Data Access System sends the change information, in the form of CNRs 56, to the interested Application Support Processors; and in a CLEAN-UP operation, the Data Access System periodically removes from its own memory the records of change information that all interested Application Support Processors have received. Both the RETRIEVE and CLEAN-UP operations are described in detail below. Fourth, if an Application Support Processor releases a previously acquired directory, the Data Access System automatically invokes a RELEASE operation and terminates the requirement that this Application Support Processor receive notification of future changes to this directory.

The Request Management Subcomponent of the Data Access System processes individual requests from the Application Support Processors. More specifically, the Request Management Subcomponent recognizes particular requests that cause a directory to be acquired by an Application Support Processor and invokes Cache Management to put that Application Support Processor on the list of those to be notified of future changes to that directory. The Request Management Subcomponent also recognizes particular requests that affect directories that were acquired by any application support processor; and generally, these requests also cause changes to various system catalogs such as the Directory Catalog, the Object Catalog, and the Authorization Catalog.

In addition, the Request Management Subcomponent builds a Work Request Block (WRB) 58 identifying and describing the catalog change and adds to the WRB additional information for Cache Management. The Work Request Blocks are used to hold this information until the end of the group of requests that comprises a work unit, whereupon the catalogues are updated and Cache Management is invoked to accumulate and store information identifying and describing the changes.

Figure 3:
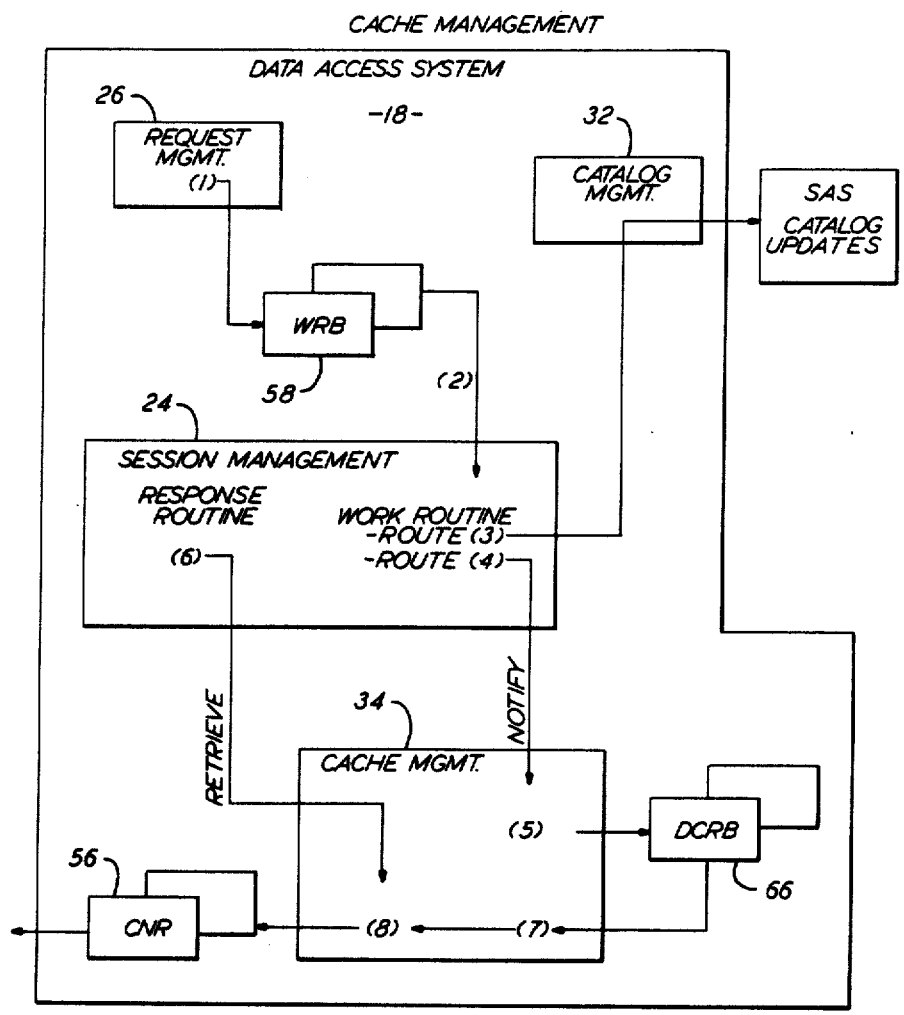
FIG. 3 is a block diagram illustrating cache data flow in a data access system.

FIG. 3 summarizes this flow of information within the Data Access System as indicated by processing steps (1) to (9). The Request Management Subcomponent builds WRBs; and at the completion of the work unit, the Work Routine of Session Management gains control of the Data Access System for managing the sequence of operations that are necessary for proper processing of the work unit.

To elaborate, the Work Routine routes the WRBs to Catalog Management, which in turn transmits the change information to the Storage Access System to update the catalogues. The Work Routine also routes the WRBs to Cache Management so that the change information in the WRBs may be saved for later transmission to the Application Support Processors. If the information in a WRB describing a change to a directory is to be saved, Cache Management creates a Directory Change Request Block (DCRB) using information from the WRB, and the DCRB holds data identifying and describing a directory change until all Application Support Processors that have acquired that directory have been notified of the change. At the conclusion of processing each normal request from an Application Support Processor, Cache Management is invoked to retrieve and to transmit to that Application Support Processor, records of changes to all the directories that have been acquired by that Support Processor.

The retrieval of the records of the directory changes is accomplished by processing DCRBs that pertain to directories that have been acquired by a subject Application Support Processor. The DCRBs that are retrieved include not only those that were built as a result of the current work unit, but also those built as a result of other, prior activations of the Data Access System by other Application Support Processors. Thus, the set of DCRBs is global to all the Application Support Processors that share the File Access Processor. Once the set of DCRBs that apply to the subject Application Support Processor is determined, Cache Notification Records (CNRs) are built to hold information identifying and describing the directory changes, and these CNRs are packaged with the current request response information for transmission to the Application Support Processor.

The DCRBs pertaining to each directory are periodically checked to determine which of these DCRBs have been transmitted to all of the Application Support Processors that have acquired the directory. Those DCRBs that have been transmitted to all of these application support processors are removed from the Data Access System and this is accomplished through a periodic Cache Management operation called CLEAN-UP.

When a particular Application Support Processor is no longer interested in being notified of changes to a particular directory, the Application Support Processor is removed from a list maintained by Cache Management for that directory. This occurs explicitly when a Cache Release request is processed by the Request Management Subcomponent, and this can be done by a RELEASE operation, which is discussed in greater detail below. In addition, if a particular Application Support Processor is terminated for any reason, that Processor is removed, by means of a PURGE operation, from all the lists of Application Support Processors that receive change records.

Cache Management is further described below in terms of the control structures utilized to record directory changes and to control the transmission of those records to the Application Support Processors, and the set of operations that manage these control structures.

Figure 4:
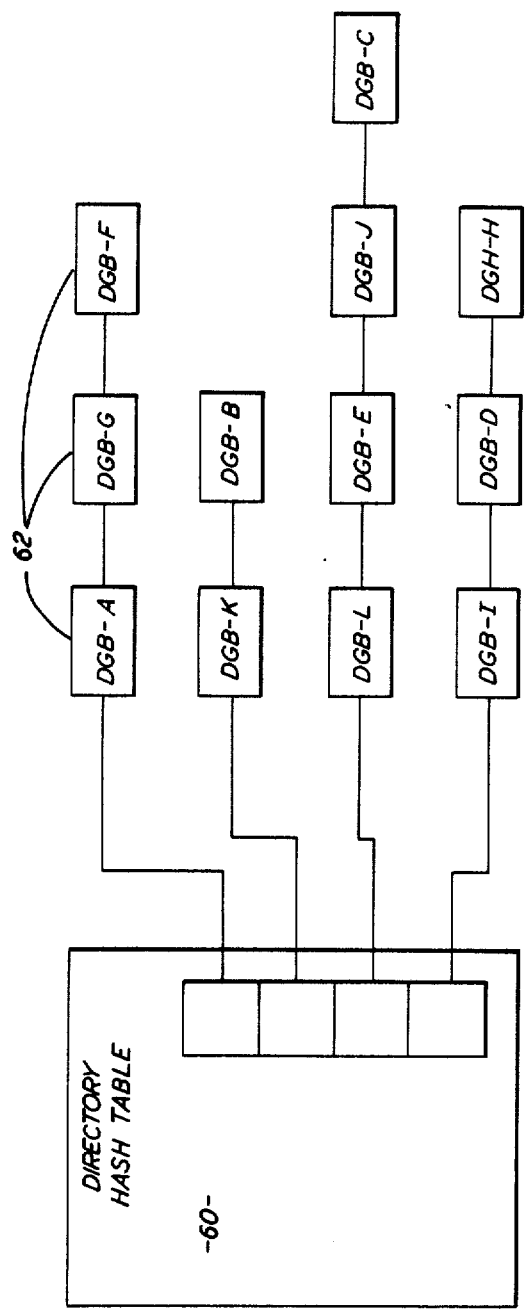
FIG. 4 is a block diagram showing cache control structures of this invention, and in particular, showing a multitude of Directory Gate Blocks chained to a Directory Hash Table.
Figure 5:
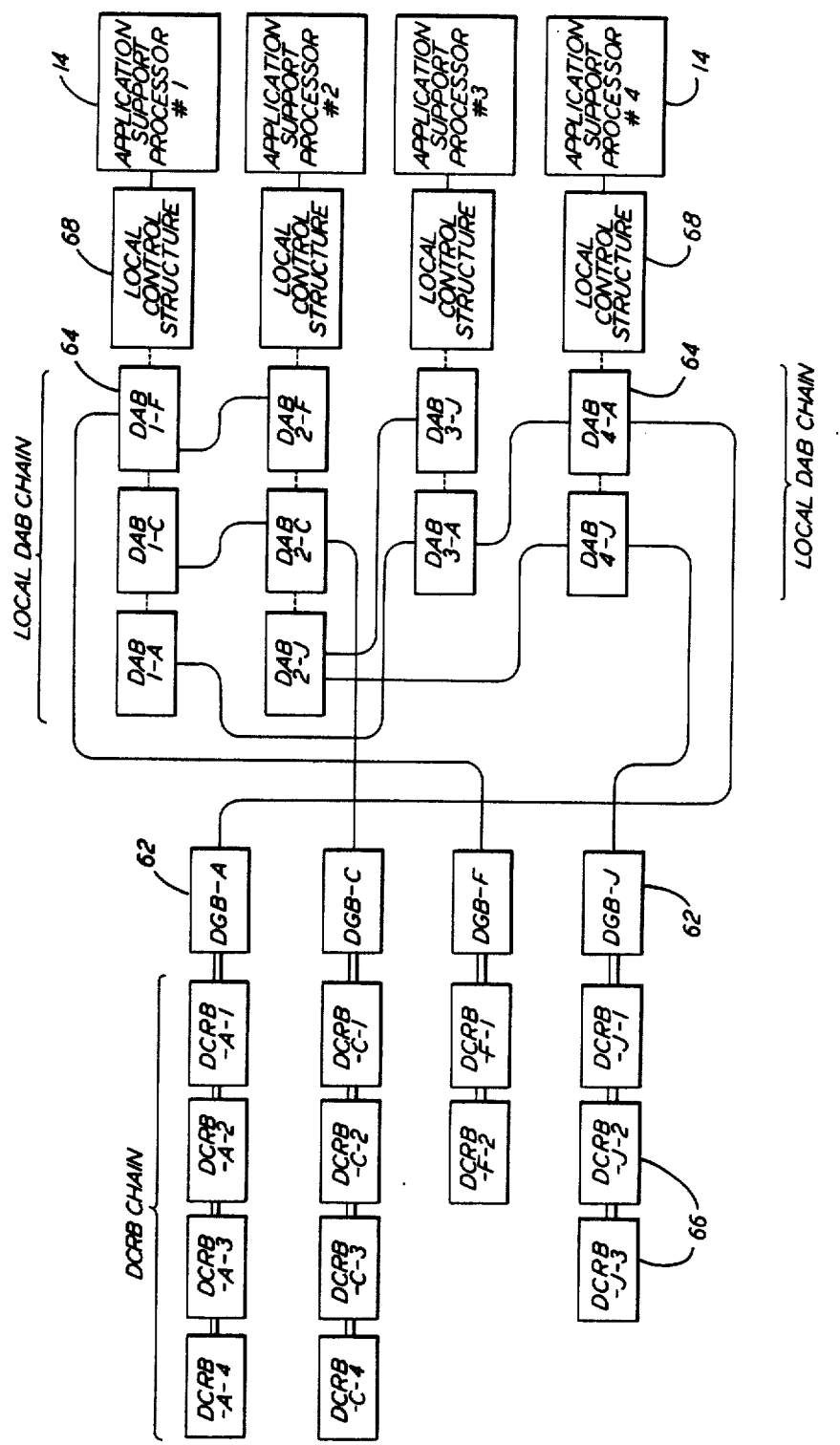
FIG. 5 also shows cache control structures, and in particular, illustrates a multitude of Directory Change Request Blocks, Directory Gate Blocks, and Directory Acquired Blocks.
Figure 6:
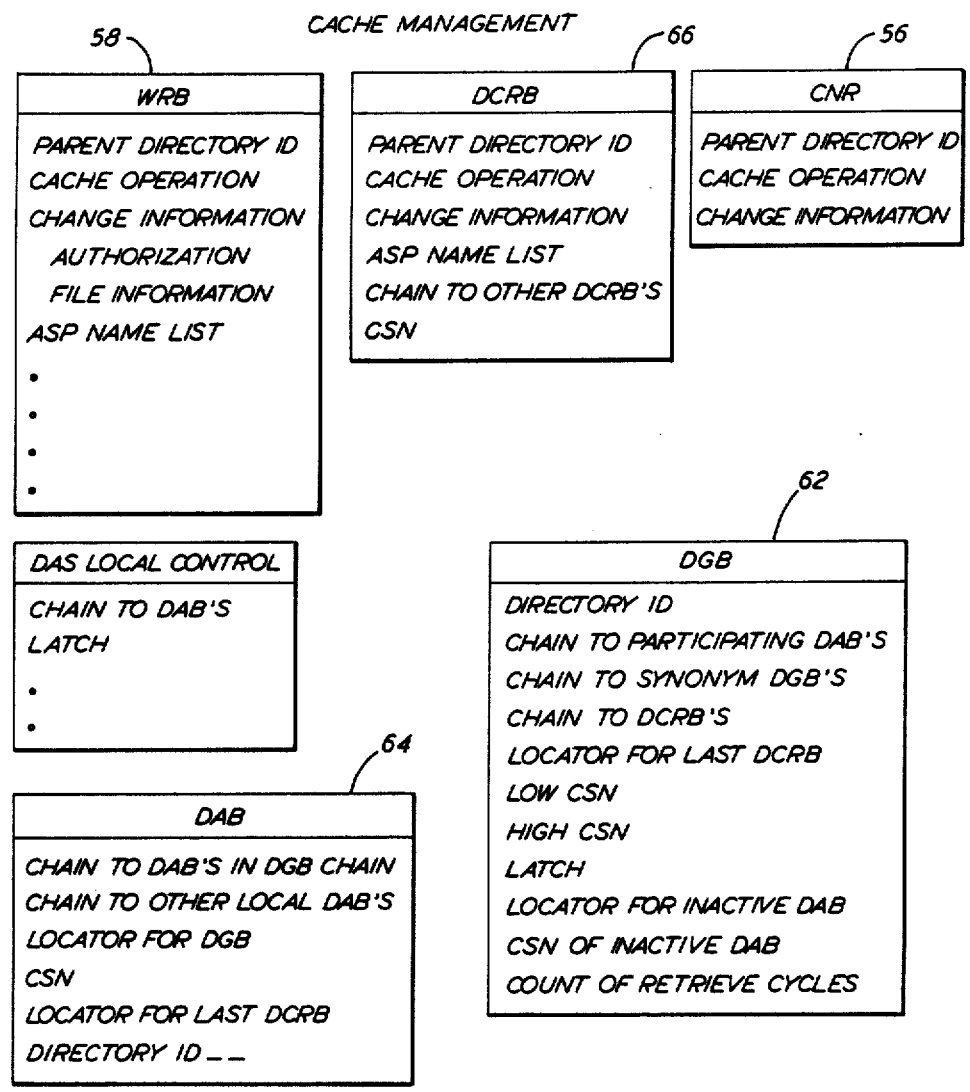
FIG. 6 illustrates the contents of several cache control structures.

With reference to FIGS. 4–6, the control structures for Cache Management include a Directory Hash Table (DHT) 60, a multitude of Directory Gate Blocks (DGBs) 62, a multitude of Directory Acquired Blocks (DABs) 64, a plurality of local control structures 68, and the above mentioned DCRBs 66. The DHT, the DGBs and the DCRBs are global to all the Application Support Processors——that is, the DHT, each DGB and each DCRB may be accessed on behalf of any of the Application Support Processors——and thus these control structures are referred to as global structures. In contrast, each DAB and each local control structure is associated with only one of the Application Support Processors, and hence the DABs and the local control structures are referred to as local structures.

A DGB is established for each directory acquired by one or more of the Application Support Processors, and a DGB is established when a currently non-acquired directory is acquired by any Application Support Processor. For example, FIG. 4 shows twelve DGBs, DGB-A - DGB-L, established for twelve directories A–L (not shown) respectively. The DGBs are grouped in sets, with each set being identified by an entry in, and being accessed through, the DHT. The DHT, in addition to identifying the DGB sets, also identifies the locations of at least one DGB in each set. As illustrated in FIG. 4, DGBs-A, -G and -F form a first set identified by a first entry in the DHT; DGBs-K and -B form a second set identified by a second entry in the DHT; DGBs-L, -E, -J and -C form a third set identified by a third entry in the DHT; and DGBs-I, -D and -H form a fourth set identified by a fourth entry in the DHT. The DGBs in a given set are said to form a DGB chain, and because the DGBs in a given chain are identified by one entry in the DHT, these DGBs are said to form a synonym DGB chain. A first DGB in each chain is identified by the DHT, and each subsequent DGB in the chain is identified by the immediately prior DGB in the chain.

All of the DCRBs holding records of changes to a given directory are grouped together in a set. Moreover, all of the DCRBs in a given set are associated with a specific DGB; and in particular, all of the DCRBs holding records of changes to a given directory are associated with the DGB that was established for that directory. For instance, FIG. 5 shows thirteen DCRBs; DCRB-A-1 - A-4; DCRB-C-1 - C-4; DCRB-F-1 and F-2; and DCRB-J-1 - J-3. DCRB-A-1 - A-4 form a first set of DCRBs associated with DGB-A because the DCRBs in this set hold records of changes to directory A, and DCRB-C-1 - DCRB-C-4 second set of DCRBs associated with DGB-C because the DCRBs in this set hold records of changes to directory C. Analogously, DCRB-F-1 and DCRB-F-2 form a third set of DCRBs associated with DGB-F, and DCRB-J-1 - DCRB-J-4 form a fourth set of DCRBs associated with DGB-J. The DCRBs in a given set are said to form a DCRB chain; and because all of the DCRBs in each chain are associated with a particular DGB, the chain is said to be anchored to that DGB. A first DCRB in each chain is identified by the DGB to which the chain is anchored, and each subsequent DCRB in the chain is identified by the immediately prior DCRB in the chain.

A directory acquired block is established each time an Application Support Processor acquires a directory, and thus a directory ACQUIRED can be considered as being established both for a particular Application Support Processor and for a particular directory. For example, FIG. 4 shows ten DABs. DAB-1-F was established when Application Support Processor 1 acquired directory F, DAB-1-C was established when Application Support Processor 1 acquired directory C, and DAB-1-A was established when Application Support Processor 1 acquired directory A. Similarly, DABs -2-F, -2-C and -2-J were established when Application Support Processor 2 acquired directories F, C and J respectively; DABs -3-J and -3-A were established when Application Support Processor 3 acquired directories J and A respectively; and DABs -4-A and -4-J were established when Application Support Processor 4 acquired directories A and J respectively.

The DABs established for a particular Application Support Processor are said to form a local DAB chain. Thus, DABs -1-F, -1-C and -1-A form a first local chain, DABs -2-F, -2-C and -2-J form a second local chain, DABs -3-J and -3-A form a third local chain, and DABs -4-A and -4-J form a fourth local chain. A data access system local control structure is established for each Application Support Processor that has acquired at least one directory, and the local control structure for each Application Support Processor may identify a first DAB in the local chain of DABs established for the Support Processor. Each subsequent DAB in the chain is identified by the immediately prior DAB in the chain.

For purposes of transmitting normal request and response data between the Application Support Processors and the File Access Processor, it may be desirable to establish a local control structure for a Support Processor each time that Support Processor activates the central File Access Processor. Each of the local control structures established for an Application Support Processor may be connected to the local chain of DABs established for that Support Processor. Indeed, it may be preferred to anchor the local chain of DABs to——that is, to identify a first DAB of that chain in——a separate, local DAB anchor structure, and to identify this DAB anchor, instead of a first DAB of the local chain, in each local control structure established for the Application Support Processor.

The DABs are also grouped according to the directories for which they are established. Thus, with the example shown in FIG. 4, DABs -1-A, -3-A and -4-A form a first such DAB group because all of these DABs were established for directory A. Likewise DABs -1-C and -2-C form a second DAB group, DABs -1-F and -2-F form a third DAB group, and DABs -2-J, -3-J and -4-J form a fourth DAB group. Furthermore, one DAB in each DAB group of this type is associated, in a manner discussed below in detail, with the DGB established for the same directory for which the DABs in the group were established.

Because of this, each DAB group of this type is said to be anchored to, or owned by, the DGB established for the same directory for which the DABs in that chain were established; and each DAB group of this type, along with the DGB anchoring that group, is said to form a DGB to participating DABs chain. For example, as shown in FIG. 5, DGB-A and DABs -1-A, -3-A and -4-A form a first DGB to participating DAB chain; and DGB-C and DABs -1-C and -2-C form a second DGB to participating DAB chain. Similarly, DGB-F and DABs -1-F and -2-F form a third DGB to participating DAB chain, and DGB-J and DABs -2-J and -4-J form a fourth DGB to participating DAB chain. A first DAB in each DGB to participating chain is identified by the DGB in the chain, and each subsequent DAB in the chain is identified by the immediately prior DAB in the chain.

FIG. 6 summarizes the contents of various cache control structures. Each WRB includes the following data items:

| |
|---|
| 1. PARENT DIRECTORY ID |
| 2. CACHE OPERATION |
| 3. CHANGE INFORMATION AUTHORIZATION FILE INFORMATION |
| 4. ASP NAME LIST |

Each DCRB includes:

| |
|---|
| 1. PARENT DIRECTORY ID |
| 2. CACHE OPERATION |
| 3. CHANGE INFORMATION |
| 4. ASP NAME LIST |
| 5. CHAIN TO OTHER DCRBs |
| 6. CSN |

Each CNR includes the data items:

| |
|---|
| 1. PARENT DIRECTORY ID |
| 2. CACHE OPERATION |
| 3. CHANGE INFORMATION |

Each DAS LOCAL CONTROL includes the following:

| |
|---|
| 1. CHAIN TO DABs |
| 2. LATCH |

Each DGB includes:

| |
|---|
| 1. DIRECTORY ID |
| 2. CHAIN TO PARTICIPATING DABs |
| 3. CHAIN TO SYNONYM DGBs |
| 4. CHAIN TO DCRBs |
| 5. LOCATOR FOR LAST DCRB |
| 6. LOW CSN |
| 7. HIGH CSN |
| 8. LATCH |
| 9. LOCATOR FOR INACTIVE DAB |
| 10. CSN OF INACTIVE DAB |
| 11. COUNT OF RETRIEVE CYCLES |

Each DAB includes the data items:

| |
|---|
| 1. CHAIN TO DABs IN DGB CHAIN |
| 2. CHAIN TO OTHER LOCAL DABs |
| 3. LOCATOR FOR DGBs |
| 4. CSN |
| 5. LOCATOR FOR LAST DCRB |
| 6. DIRECTORY ID |

PARENT DIRECTORY ID simply identifies a directory that is affected by a particular change.

CACHE OPERATION determines the nature of the change to the directory such as add, delete or update data in a directory.

CHANGE INFORMATION contains the actual changed values that are to be, or were, made in the directory.

ASP NAME LIST in the WRB lists ASPs that are authorized to acquire, or otherwise have access to, a particular directory. If an ASP is affected by a change, the name of the ASP appears on the list, and this type of change is one type of CHANGE INFORMATION.

ASP NAME LIST in the DCRB lists all the Application Support Processors that are authorized to receive the change data in the DCRB.

CHAIN TO OTHER DCRBs identifies the next DCRB in the DCRB chain to which the DCRB belongs.

CSN, which stands for Chronological Sequence Number, is a number used for control purposes to determine which DCRBs have been retrieved for particular Application Support Processors. The very first DCRB established for a particular directory has a CSN of one, and each DCRB subsequently established for that DCRB has a CSN that is one greater than the CSN of the DCRB previously established for that directory. The DCRBs in each DCRB chain are arranged in order of their CSNs. More specifically, the CSN of the first DCRB in each chain is a whole number, which may or may not be equal to 1, and each subsequent DCRB in the chain has a CSN that is one greater than the previous one. The CSN of a DAB is the same as the highest CSN of the DCRBs that have been transmitted to the directory for which the DAB was also established.

DIRECTORY ID identifies the directory for which the DGB or DAB was established.

LATCH indicates whether particular latches, discussed in detail below, have been set.

CHAIN TO DABs IN DGB CHAIN identifies the next DAB in the chain of participating DABs to which the DAB belongs.

CHAIN TO OTHER LOCAL DABs identifies the next DAB in the local chain of DABs to which the DAB belongs.

LOCATOR FOR DGB identifies the location of the DGB to which the DAB is anchored.

LOCATOR FOR LAST DCRB in the DAB identifies the location of the last DCRB that was transmitted to directory for which the DAB was established.

CHAIN TO PARTICIPATING DABs identifies a first DAB in the chain of participating DABs that are anchored to the DGB.

CHAIN TO SYNONYM DGBs identifies the next DGB in the synonym chain of DGBs to which the DGB belongs.

LOCATOR FOR LAST DCRB in the DGB identifies the location of the last DCRB in the chain of DCRBs that are chained to the DGB.

LOW CSN identifies the lowest CSN in the chain of DCRBs anchored to the DGB.

HIGH CSN identifies the highest CSN in the chain of DCRBs anchored to the DGB.

In a CLEAN-UP operation, discussed in detail below, all the DABs established for a subject directory are scanned, and the DAB having the lowest CSN is said to be the inactive DAB for that directory. All of the DCRBs established for the subject directory and having CSNs equal to or lower than the CSN of the inactive DAB, have been transmitted to all the Application Support Processors that have acquired the subject directory. Thus, all of the DCRBs relating to this directory and that have a CSN equal to or less than the CSN of the inactive DAB, can be removed during the CLEAN-UP operation.

LOCATOR FOR INACTIVE DAB in a DGB identifies the location of the DAB that was the inactive DAB the last time the CLEAN-UP operation was invoked for the directory for which the DGB was established.

CSN OF INACTIVE DAB identifies the CSN of that inactive DAB.

COUNT OF RETRIEVE CYCLES keeps track of the number of RETRIEVE operations that have been invoked for a particular directory since the last time a CLEAN-UP operation was invoked for that directory. The RETRIEVE operation is periodically invoked to transmit directory change data to the Application Support Processors; and the CLEAN-UP operation is invoked for a particular directory each time the COUNT OF RETRIEVE CYCLES for that directory reaches a predetermined, and preferably adjustable, value such as twenty.

As shown in FIG. 6, the contents of a DCRB are very similar to the contents of the WRB from which the DCRB is built. The difference is that WRBs normally contain additional information for updating system catalogs while DCRBs, which persist longer, contain additional control information such as chain locators to other DCRBs and the CSN. Likewise, the DCRB is very similar to the CNR. Since the control information is not needed once the CNR is built for notifying an Application Support Processor, it is not carried over into the CNR. DABs are vehicles for finding unretrieved DCRBs for an acquired directory, and the CSN in the DAB is used to record the CSN of the last DCRB processed for that DAB.

The DGB has locators for the beginning and end of the DCRB chain that is anchored to the DGB, and these locators are for scanning for completed DCRBs——that is DCRBs that have been transmitted to all interested Application Support Processors——and for adding new DCRBs. The DGB also has a low and a high CSN for maintaining the DCRB sequential numbering scheme. One procedure for using CSNs to control the storage and retrieval of DCRBs is presented below with the discussion of the NOTIFY and RETRIEVE operations.

Latches are used to lock various control structures, or groups of control structures, to prevent one Application Support Processor from changing control structures being used by another Application Support Processor and to prevent an Application Support Processor from using a control structure being changed by another Application Support Processor. Latches, thus, are mechanisms which provide serialization between multiple Data Access System activations that may operate concurrently.

The Cache Management System of this invention employs three types of latches referred to as a Local DAB Chain Latch, a Directory Hash Table Entry (DHTE) Latch, and a DGB Latch. A Local DAB Chain Latch is provided for each DAS LOCAL CONTROL structure to control the DAS local DAB chain; and this latch is set whenever a user at an Application Support Processor is adding or deleting to the chain of local DABs, or whenever a user is scanning for DABs in that chain. As previously mentioned, a plurality of local control structures, each anchored to the same DAB local chain, maybe established for any given Application Support Processor; and the Local DAB Chain Latch prevents the DAB local chain from being changed by one person having one local control structure, while that same DAB local chain is being processed by another person using another local control structure.

A DHTE Latch is provided for each entry in the Directory Hash Table; and this latch is set whenever the synonym chain of DGBs identified by that Hash Table Entry is being processed such as by adding DGBs to or deleting DGBs from the chain, or when searching for DGBs in the chain. A DGB Latch is provided for each DGB; and this latch is set when the DGB or the chain of DABs anchored to it are being processed, such as by adding DABs to or deleting DABs from that chain, or when scanning the DGB chain of participating DABs. The DGB Latch associated with a particular DGB is also set when adding DCRBs to or deleting DCRBs from the chain of DCRBs anchored to that DGB, or when scanning that chain for DCRBs or retrieving DCRBs from the chain. Whenever multiple latches are operating simultaneously, in order to prevent deadlocks, they are given precedence in the sequence in which they are discussed above.

Figure 7:
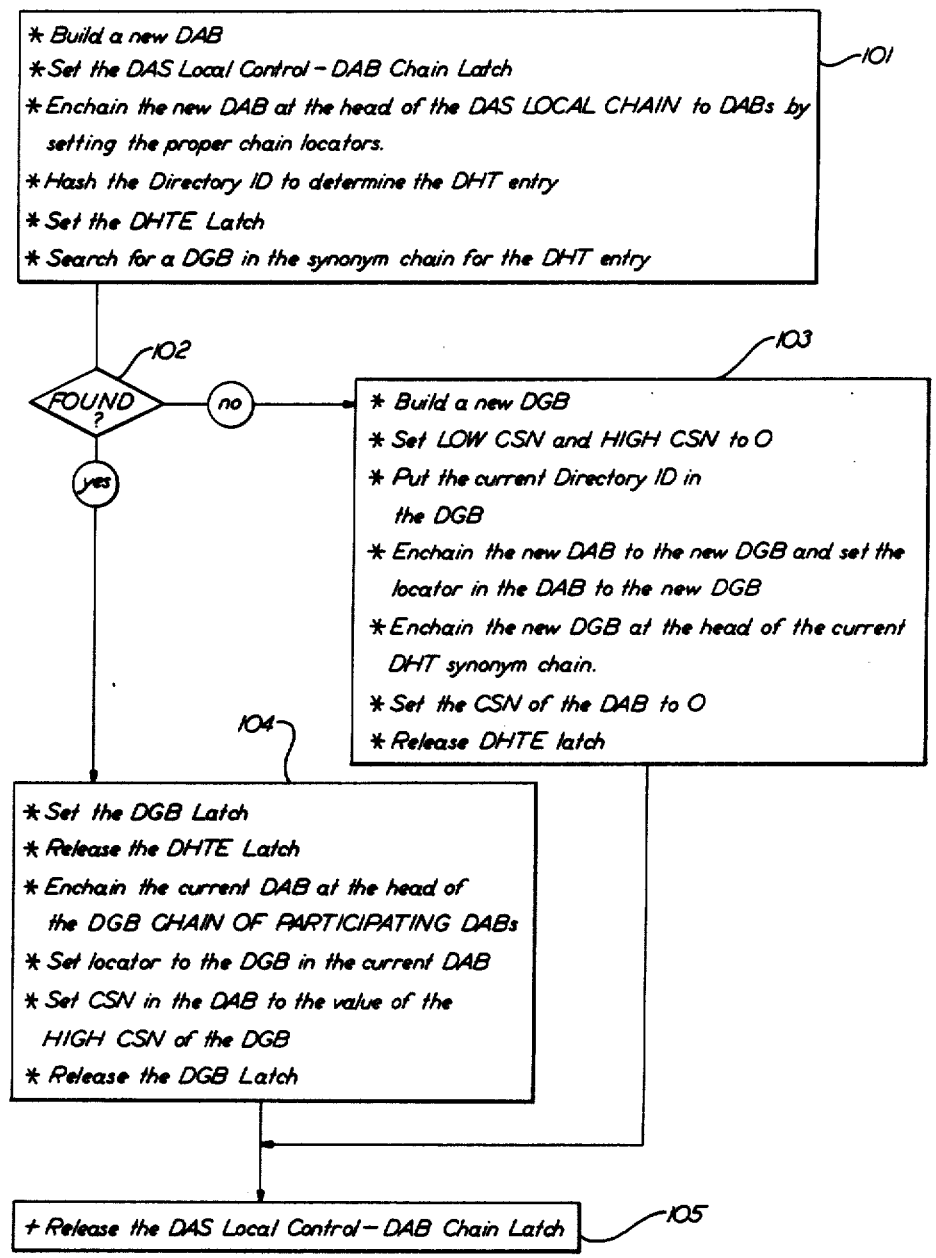
FIGS. 7 and 8 are flow charts showing the ACQUIRE and NOTIFY operations, respectively, of the cache control system of this invention.

FIG. 7 is a flow chart illustrating the ACQUIRE operation of the File Access Processor of this invention. This operation is automatically invoked whenever an Application Support Processor acquires a copy of a subject directory, and, generally, this operation, first, adds a new DAB to the local chain of DABs established for that Application Support Processor, and second, adds this new DAB to the appropriate DGB chain to participating DABs. At step 101, a new DAB is established and provided with the identification of the subject directory. Also, the DAS local control latch is set to prevent any other user at the same Application Support Processor from changing the local DAB chain, and the new DAB is enchained at the head of the local DAB chain by providing the new DAB with the location of the DAB formerly at the head of that chain. At the same time, the DHT is searched for the entry of the DGB synonym chain to which any DGB for the subject directory would belong, and the DHT latch is set to prevent anyone else from adding to or deleting DGBs from that DGB synonym chain.

At step 102 the proper DGB synonym chain is searched for a DGB established for the subject directory. If no such DGB is found, a new DGB is established at step 103 for that directory. The LOW CSN and the HIGH CSN of the new DGB are both set to zero, and the new DGB is provided with the DIRECTORY ID of the subject directory. The new DAB is enchained to the new DGB by placing the locator for this new DGB in the new DAB, and the new DGB is enchained at the head of the appropriate DGB synonym chain by identifying in the new DGB the location of the DGB formerly at the head of that chain. Also, the CSN of the new DAB is set to zero, and the DHTE latch is released If, at step 102, an existing DGB is found for the subject directory, the flow chart skips to step 104. At this step, the DGB latch is set, the DHTE latch is released, and the new DAB is enchained to the head of the DGB chain of participating DABs by identifying in the new DAB the DAB formerly at the head of that chain. Also, the locator to the DGB is set in the new DAB, the CSN in the new DAB is set to the value of the HIGH CSN of the DGB, and the DGB latch is released. From both steps 103 and 104, the flow chart moves to step 105, where the DAS local control Latch is released.

Figure 8:
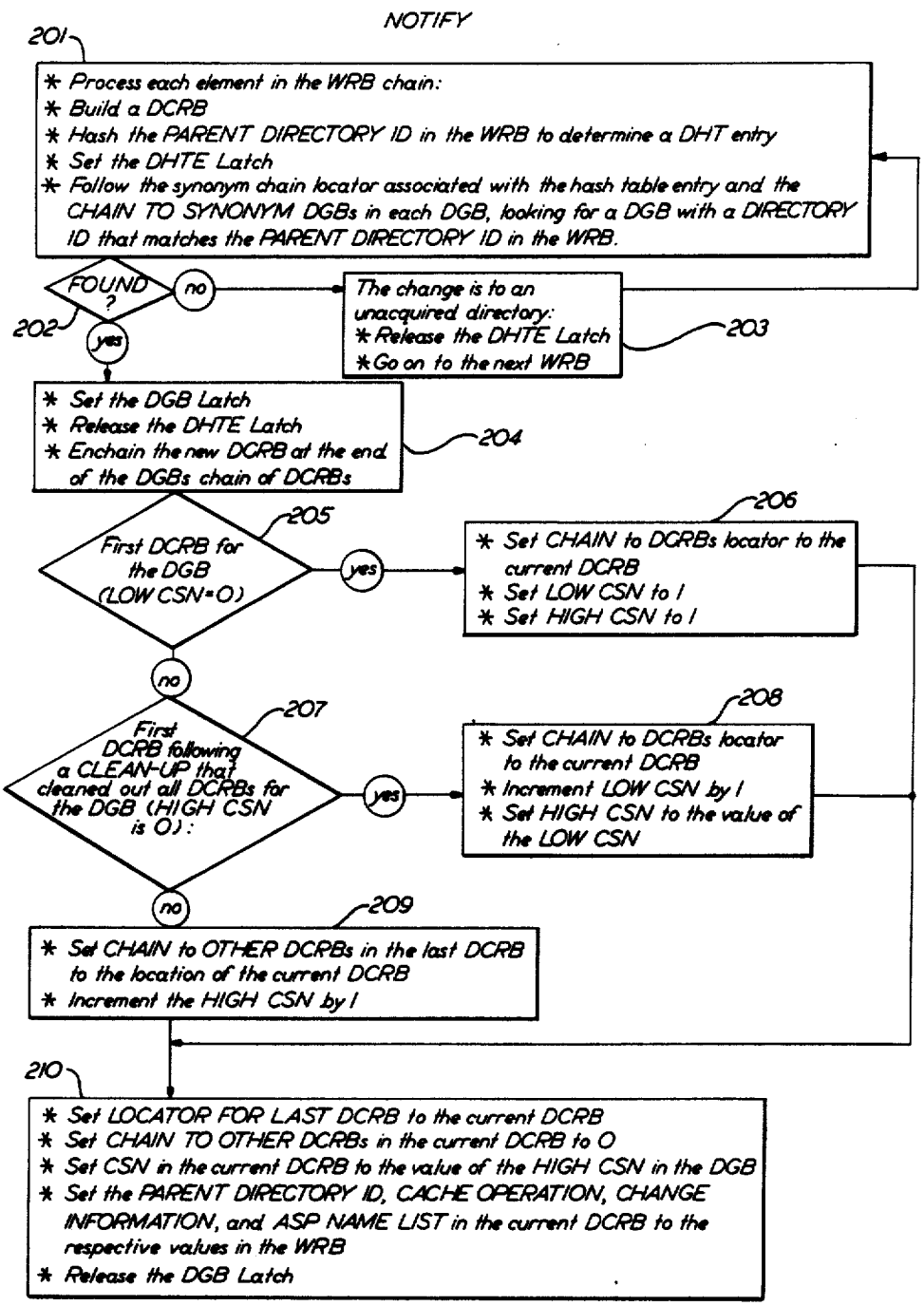

FIG. 8 is a flow chart illustrating the NOTIFY operation of the File Access Processor, and the purpose of this operation is to create DCRBs from a group of received WRBs. At step 201, a first WRB in the group is processed, and a DCRB is established. The Directory Hash Table is searched for the entry of the DGB synonym chain having any DGB for the directory listed in the WRB, and the DHTE latch is set. At step 202, the proper DGB synonym chain is searched for a DGB with a DIRECTORY I.D. that matches the PARENT DIRECTORY I.D. in the WRB. If such a DGB is not found, this means that the subject directory has not been acquired by any Application Support Processor, and there is no need to store any record of any change to the directory. In this case, the flow chart proceeds to step 203, the DHTE latch is released and the operation returns to step 201 to process the next WRB in the group of received WRBs.

If at step 202, a DGB is found with a DIRECTORY I.D. that matches the PARENT DIRECTORY I.D. in the WRB, the program skips to step 204, the DGB latch is set, the DHTE latch is released, and the DCRB is enchained to the DGB. Exactly how this is done depends on whether there are any other DCRBs currently anchored to that DGB. At step 205, the LOW CSN of the DGB is checked to see if it is zero. If it is, this means that there are no other DCRBs chained to the DCB, and the operation proceeds to step 206. The CHAIN to DCRBs locator in the DGB is set to the newly created DCRB, and the LOW CSN and the HIGH CSN of the DGB are set to one. If, however, at step 205, the LOW CSN of the DGB is not equal to zero, this means that there are DCRBs anchored to the DGB, and the operation skips from step 205 to step 207, which is to determine whether the new DCRB is the first one to be enchained to the DGB following a clean-up operation that erased or removed all the DCRBs chained to the DGB. This is done by checking to see if the HIGH CSN of the DGB is zero. If it is, this means that the DCRB is the first one following such a clean-up operation, and the NOTIFY operation moves to step 206, where the CHAIN to DCRBs locator in the DGB is set to identify the new DCRB, the LOW CSN in the DGB is increased by one, and the HIGH CSN in the DGB is set equal to the new value of the LOW CSN in the DGB.

In contrast, if at step 207, the HIGH CSN of the DGB is not zero, this means that the new DCRB is not the first one following a CLEAN-UP operation that removed all the DCRBs chained to the DGB, and that there currently remain DCRBs chained to that DAB. In this case, the NOTIFY operation proceeds from step 207 to step 209, where the CHAIN to other DCRBs in the last DCRB enchained to the DGB, is set to identify the location of the new DCRB, and the HIGH CSN of the DGB is increased by one.

From each of steps 206, 208 and 209, the procedure illustrated in FIG. 8 proceeds to step 210. The LOCATOR FOR LAST DCRB in the DGB is set to identify the new DCRB, The CHAIN TO OTHER DCRBs in the new DCRB is set to zero, and the CSN in the new DCRB is set equal to the value of the HIGH CSN in the DGB. Also, the PARENT DIRECTORY I.D., the CASHE OPERATION, the CHANGE INFORMATION, and the ASP NAME LIST are copied in the new DCRB from the WRB. Finally, the DGB latch is released.

Figure 9:
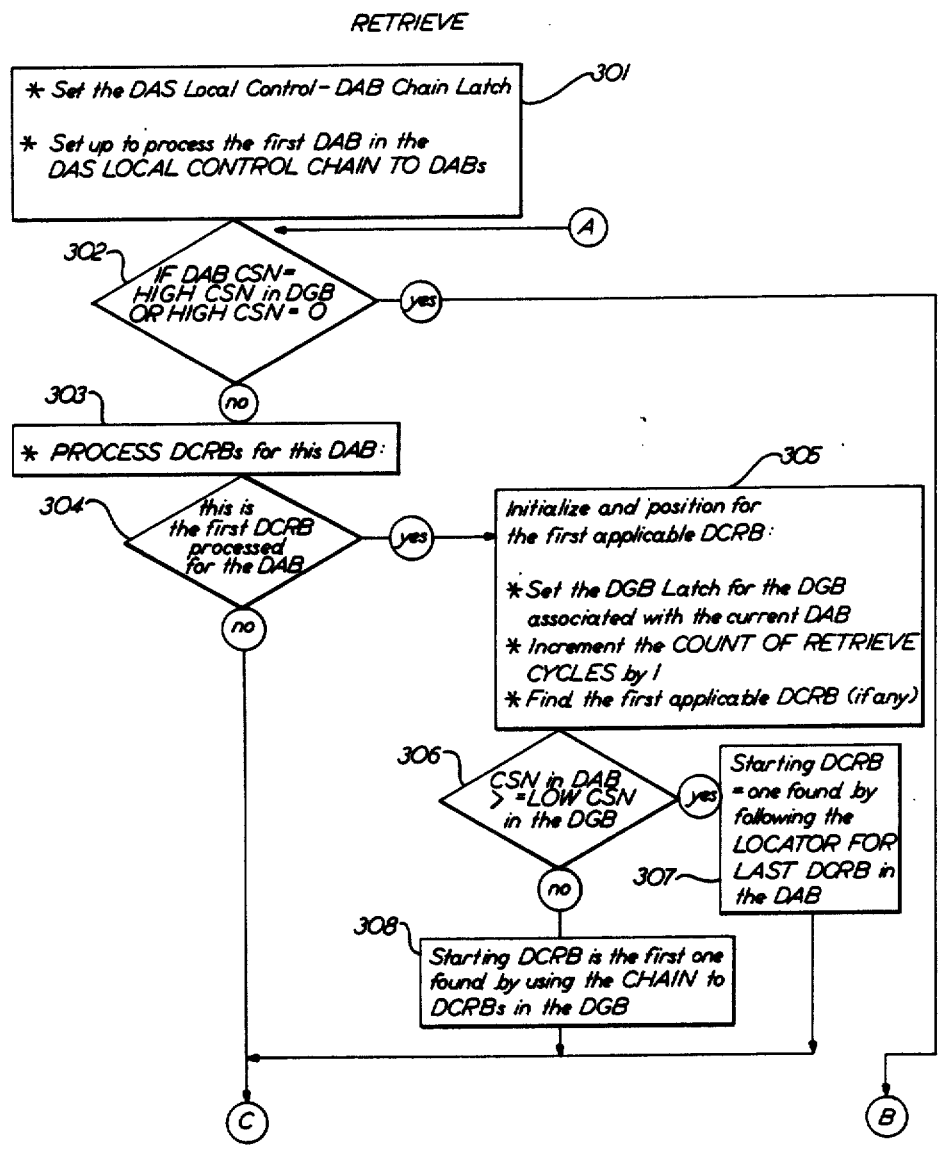
FIGS. 9 and 10 illustrate the RETRIEVE operation of the cache control system.
Figure 10:
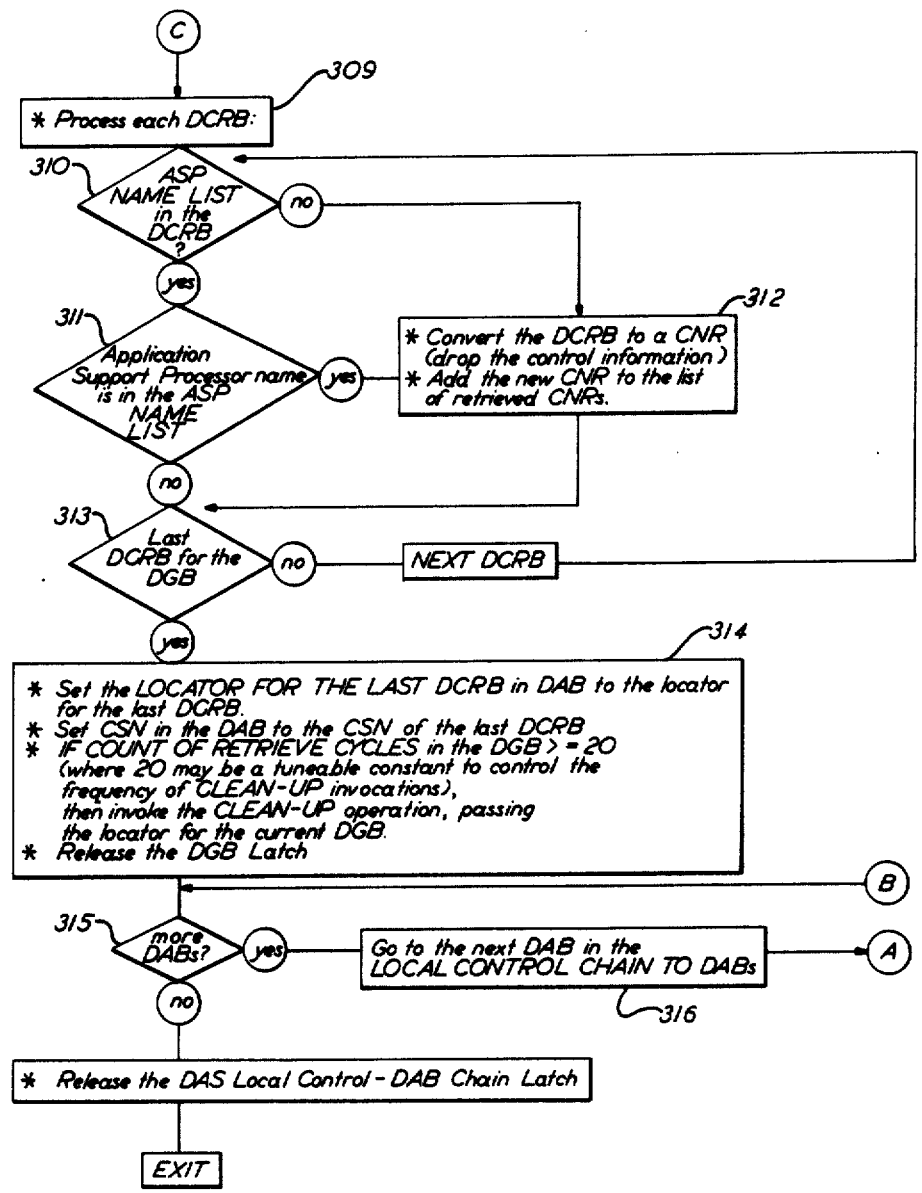

FIGS. 9 and 10 illustrate the RETRIEVE operation, which has several purposes. This operation finds all the DCRBs associated with directories acquired by the ASP that is represented by the current activation of the Data Access Processor. The RETRIEVE operation ignores the DCRBs that were previously retrieved for that Application Support Processor, and creates new CNRs from newly retrieved DCRBs. The RETRIEVE operation also maintains a list of the new CNRs and records the DCRBs that have been retrieved for purposes of sending change information to the respective Application Support Processors.

At step 301, the DAS local control latch is set, and the first DAB in the DAB local chain for the subject Application Support Processor is studied. At step 302, the CSN of that DAB is compared to the HIGH CSN of the DGB to which the DAB is anchored. If these values are equal or if HIGH CSN of the DGN equal zero, this means that there are no changes to the subject directory that are to be transmitted to the subject Application Support Processor, and the RETRIEVE operation skips directly to step 315, discussed below. If, however, the HIGH CSN of the DGB is not equal to zero and is not equal to the CSN of the DAB, then the operation proceeds to step 303, and the DCRBs for this DAB are processed.

For the first DCRB processed for the DAB, at step 304, the DGB latch is set for the DGB to which the DAB is anchored, the value of the COUNT OF RETRIEVE CYCLES in the DGB is increased by one, and then the DCRBs chained to that DGB are searched for the first applicable DCRB, if any——that is, the DCRB having the lowest CNS value in the chain and holding change information that is to be transmitted to the subject Application Support Processor. If the CSN in the DAB is greater than or equal to the LOW CSN in the DGB, then the first applicable DCRB is identified by the LOCATOR FOR LAST DCRB in the DAB; and otherwise, the first applicable DCRB is identified by the CHAIN TO DCRBs in the DGB. Once the first applicable DCRB is found, the operation proceeds to steps 309 and 310.

For each applicable DCRB, at step 310, the DCRB is checked to see if it has an ASP NAME LIST; and if it does, that list is checked at step 311 to see if the subject Application Support Processor is on the list. If the DCRB does not have an ASP NAME LIST, or if it does and the subject Application Support Processor is on that list, the operation moves to step 312, and a CNR is built from data in the DCRB. After this, the operation returns to step 309 to process the next DCRB in the DCRB chain anchored to the DAB. If a DCRB has an ASP NAME LIST and the subject Application Support Processor is not on that list, no CNR is constructed from the DCRB, and the operation returns to step 309 to process the next applicable DCRB.

After all the applicable DCRBs have been processed for a particular DAB, the operation proceeds to step 314. The LOCATOR FOR LAST DCRB in that DAB is set to identify the location of the last processed DCRB, and the CSN in the DAB is set equal to the CSN of the last processed DCRB. If COUNT OF RETRIEVE CYCLES in the DGB is greater than or equal to a given constant, such as 20, which may be adjusted by an operator, the CLEAN-UP operation is invoked; and after this, the DGB Latch is released. Steps 303-314 are repeated for each DAB in the local DAB chain for the subject Application Support Processor; and once this is completed, the DAS local control latch for that Processor is released, and the RETRIEVE operation is completed.

Figure 11:
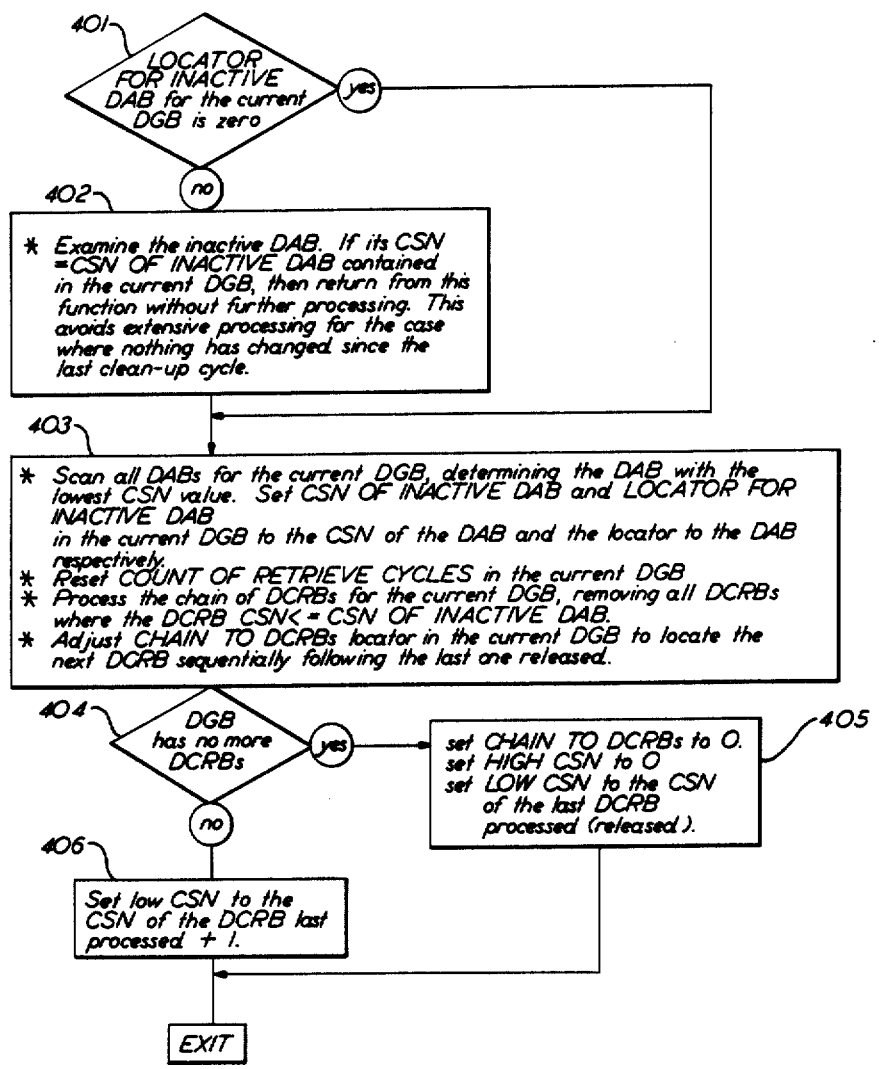
FIGS. 11 and 12 are flow charts illustrating the CLEAN-UP and RELEASE operations, respectively, of the cache control system of this invention.

FIG. 11 is a flow chart illustrating the CLEAN-UP operation, which is internally invoked during the RETRIEVE operation to erase DCRBs chained to the DGB established for a given directory. In particular, the CLEAN-UP operation erases DCRBs chained to this DGB and that have been retrieved for all participating Application Support Processors that have acquired the given directory. At step 401, the LOCATOR FOR INACTIVE DAB of the subject DGB is checked, and if this locator is not zero, the operation moves to step 402. At step 402, the CSN of the inactive DAB is compared to the CSN OF INACTIVE DAB in the current DGB, and if these two values are equal, the CLEAN-UP operation terminates, and the program returns to the RETRIEVE operation for further processing. This avoids extensive processing in the case where nothing has changed since the last time the CLEAN-UP cycle was invoked.

If at step 401, the LOCATOR FOR INACTIVE DAB of the DGB is zero, the operation skips step 402 and proceeds to step 403. Also, if at step 402, the CSN of the inactive DAB is not equal to the CSN OF INACTIVE DAB in the DGB, the operation proceeds to step 403. At this step, all the DABs chained to the DGB are scanned to find the DAB with the lowest CSN value, and this DAB becomes the new inactive DAB. The CSN OF INACTIVE DAB in the DGB is set to the value of the CSN in the inactive DAB, the LOCATOR FOR INACTIVE DAB in the DGB is set to identify the location of the inactive DAB, and the COUNT OF RETRIEVE CYCLES in the DGB is reset. Also, the chain of DCRBs for the DGB is processed; and in particular, all the DCRBs having CSN values less than or equal to the value of the CSN OF INACTIVE DAB, are released or removed. Next, the CHAIN TO DCRBs in the DGB is adjusted to identify the next DCRB sequentially following the last one released.

At step 404, all the DCRBs for the DGB are checked to see if they have been released. If they have, then at step 405, the CHAIN TO DCRBs and the HIGH CSN of the DGB are both set to zero, and the LOW CSN of the DGB is set to the CSN of the last DCRB released. If, in contrast, not all of the DCRBs are released, then the operation skips to step 406 from step 404, and LOW CSN of the DGB is set equal to the value of the CSN of the DCRB Last released, plus one.

Figure 12:
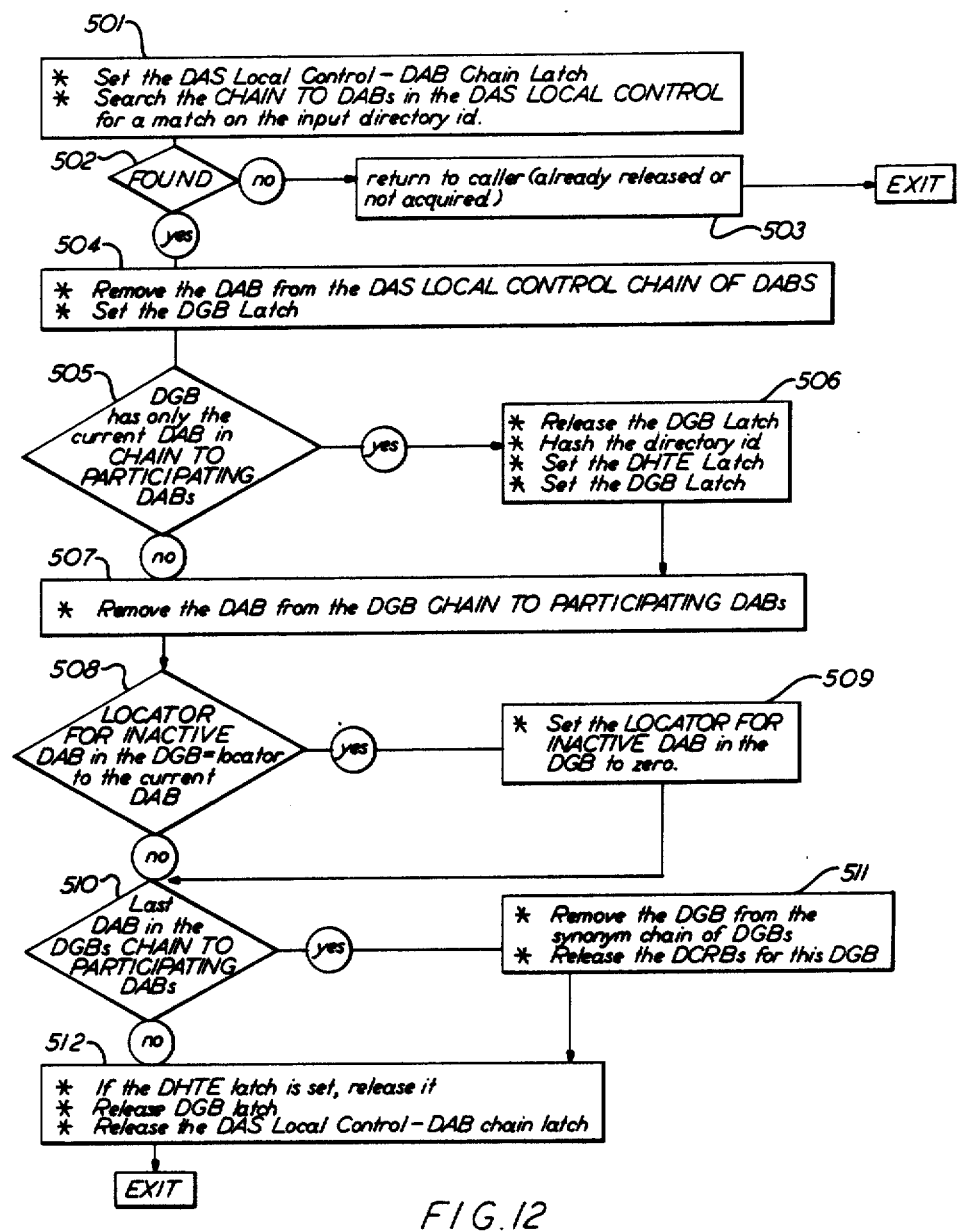

FIG. 12 is a flow chart outlining the RELEASE operation, which terminates the requirement that a subject Application Support Processor be notified of further changes in a particular directory, and this operation is automatically invoked when the subject Application Support Processor releases a previously acquired directory. The RELEASE operation results in the elimination of a DAB; and if this DAB is the only, or the only remaining, DAB for a given DGB, the DGB is also released.

At step 501, the DAS local chain latch of the subject Application Support Processor is set; and at step 502, the chain of local DABs for the subject Application Support Processor is searched for a DAB that was established for the released directory. If there is no such DAB, there is, of course, no need to release the DAB, and the program terminates. If, however, there is a DAB for the released directory, then at step 504 that DAB is removed from the local chain of DABs, and the DGB latch is set. At step 505, the DGB for the released directory is checked to see if the only DAB chained to it is the current DAB. If it is, the operation proceeds to step 506, the DGB latch is released, the Directory Hash Table is searched for the entry identifying the set to which the current DGB belongs and the DHTE and DGB latches are set. The program then proceeds to step 507, where the DAB is removed from the DGB CHAIN TO PARTICIPATING DABs.

If, at step 505, the current DAB is not the only DAB in its chain to participating DABs, then there is no need to remove the DGB that anchors that chain, and the flow chart skips to step 507 and the DAB is removed from the DGB chain to participating DABs. At step 508 the LOCATOR FOR INACTIVE DAB in the DGB is checked to see if it is the locator to the current DAB. If it is, the LOCATOR FOR INACTIVE DAB in the DGB is reset to zero at step 509, and the program moves to step 510. If, at step 508 the LOCATOR FOR INACTIVE DAB is not the locator to the current DAB, the flow chart skips step 509 and proceeds directly to step 510.

At step 510, the DGBs CHAIN TO PARTICIPATING DABs is again checked to see if the current DAB is the only one in that chain. If it is, the DGB is removed from the synonym chain of DGBs, and all the DCRBs chained to this DGB are released, and the DHTE latch is released. The final step in the flow chart illustrated in FIG. 12 is to release the DHTE latch if it is set, to release the DGB latch, and to release the DAS local control latch.

Figure 13:
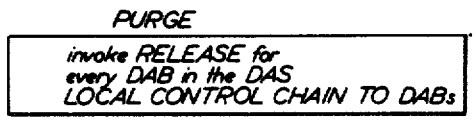
FIG. 13 depicts the PURGE operation of the cache control system.

FIG. 13 illustrates the purge operation, which is used to remove all previously acquired directories from a particular Application Support Processor so that all CSN retrievals are terminated for that Application Support Processor. This operation basically comprises a series of RELEASE operations, and, more specifically, a RELEASE operation is invoked for each DAB established for the subject Application Support Processor.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

We claim:

1. A method of operating a file sharing system including a central data access system, a plurality of application support processors connected to the data access system, and a data storage system also connected to the data access system and holding a data base, the method comprising the steps of:

forming a plurality of directories from data in the data base;

acquiring at least one of the directories in at least one of the application support processors;

for each directory acquired by at least one application support processor, establishing a directory gate block;

for each application support processor that has acquired at least one directory
(i) establishing a local control structure,
(ii) establishing a directory acquired block for each directory acquired by the application support processor, and identifying in each directory acquired block, a location of the directory gate block established for the directory for which the directory acquired block was established,
(iii) arranging in a local chain, directory acquired blocks established for the application support processor,
(iv) identifying a first of the directory acquired blocks in said local chain, in the local control structure, and
(v) identifying each successive directory acquired block in said local chain in a prior directory acquired block in the chain;

using the application support processors to activate the data access system to make changes to the database;

for each directory acquired by at least one application support processor,
(i) storing in the data access system, records of changes to the database that affect the directory,
(ii) arranging records of said changes in a record chain,
(iii) identifying a location of a first of the records in the record chain, in the directory gate block established for the directory, and
(iv) identifying a location of each successive record in the record chain, in a prior record in the chain; and periodically transmitting to the application support processors, records of changes to the data base that affect the directories acquired by the application support processors to update the acquired directories, the transmitting step including the step of, for each application support processor that has acquired at least one directory,
(i) periodically checking the directory acquired blocks established for the application support processor to identify all the directories acquired by that application support processor, and
(ii) transmitting to the application support processor records of changes to the database that affect the directories acquired by the application support processor.

2. A file sharing system, comprising:

a file access processor for processing requests, and including a central data access system, and a storage access system for accessing a database, the storage access system being connected to the central data access system to transmit data to and to receive data from the central data access system, the central data access system including
(i) means to form a plurality of directories from data in the database, and
(ii) means to change data in the database;

a plurality of application support processors connected to the central data access system to transmit data to and to receive data from the central data access system, each application support processor including
(i) means to receive input from a user and to transmit the input to the central data access system, and
(ii) a cache to acquire and hold directories formed by the data access system;

for each directory acquired by at least one application support processor, the central data access system further including (iii) a directory gate block;

the central data access system further including (iv) means to form a multitude of directory change request blocks, each formed directory change request block holding information describing a change in the database that affect one of the directories, the formed directory change request blocks holding information describing changes that affect a given directory being grouped in a chain, with a first directory change request block in the chain being identified by the directory gate block established for the given directory, and each subsequent directory change request block in the chain being identified by a prior directory change request block in the chain;

for each application support processor that has acquired at least one directory, the central data access system further including
(v) a local control structure, and
(vi) a directory acquired block for each directory copied by the application support processor, directory acquired blocks being grouped in a local chain, a first directory acquired block in the local chain being identified by the local control structure, each subsequent directory acquired block in the local chain being identified by a prior directory acquired block in the chain, to help identify all the directories copied by the application support processor.

3. A method of maintaining updated file characteristics in a file sharing system wherein a plurality of application support processors each have their own local cache structure for holding copies of all directories which they have acquired, comprising the following steps:
creating a change request block for globally holding updated information identifying and describing a change in a database that applies to a directory;
establishing a directory acquired block in a local structure for each application support processor whenever a directory is acquired by the application support processor to identify each directory which is acquired;
checking periodically to identify all the directories acquired by each application support processor;
keeping track of those change request blocks which relate to a particular directory; and
transmitting the updated information in all of those change request blocks to the local cache structure for every application support processor which has acquired that particular directory.

4. A method according to claim 3 further including the step of periodically removing the records of changes in the change request blocks that affect a particular directory and that have been transmitted to all of the application support processors that have acquired the particular directory.

5. A method according to claim 4, further including the step of storing consecutive control numbers identifying every one of the changes that affect each directory.

6. A method according to claim 5, wherein the removing step includes the steps of:
for each directory acquired by each application support processor, recording a highest numbered record of changes that affect the directory that have been transmitted to the application support processor; and
for each directory, periodically removing the records of changes that affect the directory and that are identified by a control number equal to or less than said highest numbered record.

7. A method according to claim 6, wherein the step of recording the highest numbered record of changes that affect a directory and that have been transmitted to an application support processor includes the step of recording said highest numbered record in the directory acquired block established for the directory and the application support processor.

8. A method according to claim 3, further including the steps of, for each directory acquired by at least one application support processor,
arranging in a participating chain, the directory acquired blocks established for the directory,
identifying a first of the directory acquired blocks in said participating chain, in a directory gate block established for keeping track of change request blocks for the directory; and
identifying each successive directory acquired block in said participating chain, in a prior directory acquired block in the participating chain.

9. A method according to claim 3 further including for each directory the steps of arranging the change request blocks in a record chain, identifying the location of a first change request block in a directory gate block established for the directory, identifying the location of each successive record in the record chain through other records in the chain, and identifying in each directory acquired block a location of the directory gate block established for the same directory.

10. A method according to claim 9, wherein:
for each directory acquired by at least one application support processor, a step of arranging records of changes that affect the directory includes the step of identifying consecutively stored records of changes that affect the directory by consecutive numbers; and
for each directory acquired by each application support processor, the step of maintaining the register of the records of changes that affect the directory and that have been transmitted to the application support processor includes the step of recording a highest numbered record of changes that affect the directory and that have been transmitted to the application support processor.

11. A method according to claim 10, wherein for each directory acquired by each application support processor, the step of recording the highest numbered record of changes that affect the directory and that have been transmitted to the application support processor, includes the step of recording in the directory acquired block established for the directory a control number indicating said highest numbered record transmitted, and
wherein said method further includes the step of keeping in the directory gate block established for the directory a different control number indicating a lowest numbered record awaiting to be transmitted.

12. A method according to claim 3 further including the steps of, for each directory acquired by each application support processor, maintaining a register of the records of changes that affect the directory and that have been transmitted to the application support processor, and transmitting to the application support processor only the records of changes that affect the directory and that were not previously transmitted to the application support processor.

13. A method according to claim 3 wherein said creating step further includes determining the identity of a directory for which updated information in a new change request block has been received, and then searching a directory hash table to locate any other change request blocks having additional updated information for the same directory.

14. A method according to claim 3 wherein the file sharing system includes global and local control structures, and further including latching various control structures to prevent processing on behalf of one application support processor from changing control structures being used on behalf of another application support processor.

15. A file sharing system for maintaining updated file characteristics wherein a plurality of application support processors each have their own local cache structure for holding copies of all directories which they have acquired, comprising:

global control means for creating a change request block holding updated information from a database applicable to a directory;

a local control structure associated with each application support processor and which is connected with said global control means, said local control structure including a directory acquired block for each directory acquired by the application support processor;

monitor means in communication with said global control means and said local control structure for listing all the directories acquired by each application support processor, and for keeping track of all change request blocks relating to a particular directory; and data transfer path means between said global control means and the application support processors and through said local control structure and activated by said monitor means, for transmitting the updated information in change request blocks to every application support processor which has acquired that particular directory.

16. A file sharing system according to claim 15, wherein:

all of the directory acquired blocks established for a given directory are grouped in a participating chain;

a first of the directory acquired blocks in the participating chain is identified by the directory gate block established for a given directory; and each subsequent directory acquired block in the participating chain is identified by a prior directory acquired block in the participating chain.

17. A file sharing system according to claim 16, further including means to remove directory change request blocks describing changes that affect a given directory and that have been transmitted to all the application support processors that have acquired the given directory.

18. A file sharing system according to claim 15 wherein each directory acquired block includes means forming a chain with every other such directory acquired blocks for the given directory as well as means identifying the location of a directory gate block established for keeping track of change request blocks for the given directory.

19. A file sharing system according to claim 17, wherein the means to remove the directory change request blocks includes means to identify the directory change request blocks describing changes that affect a given directory and that have been transmitted to all the application support processors that have acquired the given directory.

20. A file sharing system according to claim 19, wherein:

the directory change request blocks describing changes that affect each acquired directory are numbered consecutively within the chain formed by the directory change request blocks; and the directory acquired block established for a given directory and a given application support processor includes means identifying the number of the highest numbered directory change request block describing changes that the given directory and that has been transmitted to the given application support processor.

21. A file sharing system according to claim 20, wherein the means to identify the directory change request blocks further includes means to scan the directory acquired blocks established for the given directory for the lowest number of said highest numbered directory change request blocks.

22. A file sharing system according to claim 20, wherein the directory gate block for each acquired directory further includes:

means identifying a lowest numbered directory change request block holding changes that affect the directory; and means identifying the highest numbered directory change request block holding changes that affect the directory.

23. A file sharing system according to claim 20, wherein each directory change request block holding a change that affects a given directory includes:

means identifying the given directory;

means identifying the change that affect the given directory.

24. A file sharing system according to claim 23, wherein selected directory change request blocks further include means identifying the application support processors authorized to receive data in the selected directory change request blocks.

25. A file sharing system of claim 16 wherein said global control means includes a directory hash table for locating any directory gate block established for a given directory.

26. A file sharing system of claim 15 which further includes latching means coupled to said global control means and said local control structure for preventing one application support processor from interfering with control blocks which are being processed by another application support processor.

* * * * *